United States Patent [19]

Dover et al.

[11] Patent Number: 5,678,675

[45] Date of Patent: Oct. 21, 1997

[54] CLUTCH PLATE

[75] Inventors: Charles E. Dover, Merrill; Robert H. Field, Bay City; Lorne L. Ebel, Northville, all of Mich.

[73] Assignee: Means Industries, Saginaw, Mich.

[21] Appl. No.: 702,211

[22] Filed: Aug. 23, 1996

Related U.S. Application Data

[63] Continuation of Ser. No. 352,602, Dec. 9, 1994, abandoned.

[51] Int. Cl.⁶ .................................................. F16D 13/64
[52] U.S. Cl. ................................... 192/107 R; 29/428
[58] Field of Search ........................... 192/70.12, 70.14, 192/58.41, 107 R, 113.3, 113.34; 29/428

[56] References Cited

U.S. PATENT DOCUMENTS

| | | |
|---|---|---|
| 1,170,784 | 2/1916 | Sunden ........................ 192/107 R X |
| 1,808,511 | 6/1931 | Robbins ........................ 192/113.34 |
| 1,872,250 | 8/1932 | Coughtry . | 
| 2,091,270 | 8/1937 | Colman . |
| 2,738,864 | 3/1956 | Becker ........................ 192/107 R X |
| 2,976,975 | 3/1961 | Thostenson et al. . |
| 3,376,960 | 4/1968 | Bender ........................ 192/107 R X |
| 3,468,402 | 9/1969 | Edwards . |
| 3,480,117 | 11/1969 | Agren et al. . |
| 4,358,001 | 11/1982 | Iverson . |
| 4,856,635 | 8/1989 | Vlamakis ........................ 192/70.12 |
| 5,094,331 | 3/1992 | Fujimoto et al. . |
| 5,148,900 | 9/1992 | Mohan . |
| 5,232,075 | 8/1993 | Mohan . |
| 5,240,095 | 8/1993 | Shimamura et al. . |

FOREIGN PATENT DOCUMENTS

| | | |
|---|---|---|
| 703083 | 2/1941 | Germany . |
| 3828421C1 | 3/1989 | Germany . |
| 62-124327 | 6/1987 | Japan ........................ 192/70.12 |
| 1-255725 | 10/1989 | Japan ........................ 192/113.3 |

*Primary Examiner*—Rodney H. Bonck
*Attorney, Agent, or Firm*—Brooks & Kushman P.C.

[57] ABSTRACT

A clutch separator plate for use in an automatic transmission of a motor vehicle. The clutch separator plate comprises a first plate and at least a second plate, the first plate having a first side defining a first protrusion and a second side, the second plate having a third side and a fourth side, and the first plate and the second plate being used together by placing the first side of the first plate adjacent either one of the third side or the fourth side of the second plate such that the first plate and the second plate will be spaced apart by the first protrusion during use.

29 Claims, 6 Drawing Sheets

CLUTCH PLATE

This is a continuation of application Ser. No. 08/352,602 filed on Dec. 9, 1994 and now abandoned.

TECHNICAL FIELD

This invention relates to a clutch plate for use in the automatic transmission of a motor vehicle.

BACKGROUND ART

Automatic transmissions used in motor vehicles generally employ clutch assemblies. These clutch assemblies typically include unitary friction clutch plates having internal splines which are alternated with unitary separator clutch plates having external splines. The unitary separator plates and unitary friction plates are typically placed within a clutch housing which has a spline configuration designed to mate with the external splines of the separator plates thereby allowing the separator plates to slide back and forth within the clutch housing. The internal splines of the friction plates likewise slidably engage the mating splines of a clutch shaft or hub assembly located within the clutch housing.

Separator clutch plates are typically manufactured by using the punch and die method of manufacture. In accordance with this method, a steel punch tool having the configuration of the desired separator plate is used to punch a separator plate out of a sheet of metal. During the punching process, the sheet of metal is supported on a die having a hole which likewise has a configuration of the desired separator plate, only slightly larger than the dimensions of the punch.

During the punching process, as the sheet of metal is being forced through the die, the leading or shear side of the separator plate being formed is typically depressed slightly and the leading edge is normally radiused to some extent. As the sheet of metal is forced further through the die, a portion of the desired separator plate is sheared from the remaining sheet metal, thereby forming a substantially smooth shear surface which is substantially perpendicular to the sheet of metal. Finally, as the sheet of metal is forced completely through the die, the last interconnecting portion between the sheet of metal and the trailing edge of the separator plate being formed breaks, thus resulting in a die break section of the outer edge of the separator plate. This die break section is somewhat rough and depressed relative to the shear section. As a result of the die break, the trailing edge of the separator plate normally projects to some extent beyond the trailing or die break side of the separator plate.

Furthermore, a separator plate formed by using the punch and die method will also normally have some other small distortions caused by the stresses inherent in this method of manufacture. For example, the leading or shear side of the separator plate may have a slight side surface rise or upset protrusion along a circle defined by the edge of where the leading or shear side depression.

Separator clutch plates may also be manufactured by using the fine blanking method of manufacture. This method is similar to the punch and die method except that the tolerances of the punch and die are substantially identical. As a result, substantially the total width of the edge of a separator plate formed by the fine blanking method is sheared from the sheet of metal material being used, thereby eliminating, for the most part, any die break section.

These typical unitary separator plates formed by the punch and die or fine blanking methods are undesirable for several reasons. First, because the fine blanking manufacturing process requires extremely close tolerances to be effective, separator plates manufactured through the use of the fine blanking method are more expensive than those made using the punch and die method. The blanking tools are initially more expensive, owing to the close tolerances required, and the tools must be replaced more frequently to maintain the required tolerances. As a result of the extra expense involved, the punch and die approach is typically employed to manufacture separator plates.

However, typical unitary separator plates manufactured by the punch and die method are undesirable because the circumferential shear surface provides only a single slidable bearing surface within the clutch housing, a bearing surface which is off center. Also, the sharp transition between the shear surface and the die break may interfere with the proper function of the clutch separator plate within the clutch housing and can cause wear within the clutch housing.

Another problem associated with the typical unitary separator plates presently used is heating. During operation of the transmission, clutch separator plates typically tend to heat up. As a result, hot spotting may occur and the durability of the separator plates can be negatively affected.

SUMMARY OF THE INVENTION

An object of the present invention is to provide an improved separator plate which minimizes hot spotting and thereby prolongs the useful life of the improved separator plate. Another object of the present invention is to provide an improved separator plate which may be economically manufactured using the punch and die method, and which provides two or more slidable bearing surfaces which may be symmetrical and upon which the separator plates may easily slide within the clutch housing.

In carrying out the above objects, the applicant's invention is a clutch separator plate comprising a first plate and at least a second plate. The first plate has a first side defining a first protrusion and a second side. The second plate has a third side and a fourth side. The first plate and at least the second plate are used together to form the clutch separator plate by placing the first side of the first plate adjacent either one of the third side or the fourth side of the second plate such that the first plate and the second plate will be spaced apart by the first protrusion during use.

Because each separator plate now comprises two or more thinner plates, the surface area available for heat dissipation is at least doubled and a thin film of the lubricating/cooling fluid normally used within the clutch housing of an automatic transmission will be present between the two or more plates thereby cooling the plates and minimizing any hot spotting which can negatively affect durability. Furthermore, because the two or more thinner plates forming each separator plate are spaced apart by a protrusion, the flow of a thin film of lubricating/cooling fluid between the two or more plates will be facilitated thereby increasing the cooling effect.

In a preferred embodiment, the first and second plates have outside perimeters defining a spline which slide back and forth within the clutch housing and a protrusion used to space apart the first and second plates is confined to the area of the spline. Accordingly, the protrusions will keep the two or more plates in a spaced apart relationship for cooling while not interfering with the normal functioning of the clutch assembly.

In an alternative preferred embodiment, the clutch separator plate comprises a first plate having a first die break side and a first shear side resulting from a punch and die method of manufacture and at least a second plate having a second die break side and a second shear side resulting from a punch and die method of manufacture. In use, the separator plate is formed by using the first and second plates together with either one of the first die break side or the first shear side adjacent either one of the second die break side or second shear side. Because of the various deformations resulting from the punch and die method of manufacture, a small amount of space will typically be present between the two or more plates thereby facilitating the flow of a thin film of lubricating/cooling fluid between the two or more plates. Additionally, because each separator plate now comprises at least two or more thinner plates formed by the punch and die method, each separator plate will have at least two circumferential shear bearing surfaces within the clutch housing which facilitates the sliding of the separator plate within the clutch housing.

In a preferred embodiment of this alternative, the first die break side of the first plate is placed adjacent the second die break side of the second plate. The resulting separator plate will have two circumferential shear bearing surfaces located symmetrically on each side of the separator plate which facilitates sliding of the separator plate within the clutch housing. Also, the circumferential radiused leading edges will be located symmetrically on the outermost edges of each separator plate to further facilitate sliding. The resulting geometry minimizes interferences with, and any resulting wear to, the clutch housing within which the separator plate slides.

Furthermore, in this preferred embodiment, the adjacent die breaks form a slight depression along the center circumferential surface of the separator plate, thereby providing a pocket for fluids which aid in allowing the plates to slide properly within the clutch housing of the automatic transmission.

Further objects and advantages of this invention will be apparent from the following description, reference being had to the accompanying drawings wherein preferred embodiments of the present invention are clearly shown.

BRIEF DESCRIPTION OF THE DRAWINGS

While embodiments of the invention are illustrated, the particular embodiments shown should not be construed to limit the claims. It is anticipated that various changes and modifications may be made without departing from the scope of this invention.

BEST MODE FOR CARRYING OUT THE INVENTION

Figure 1:
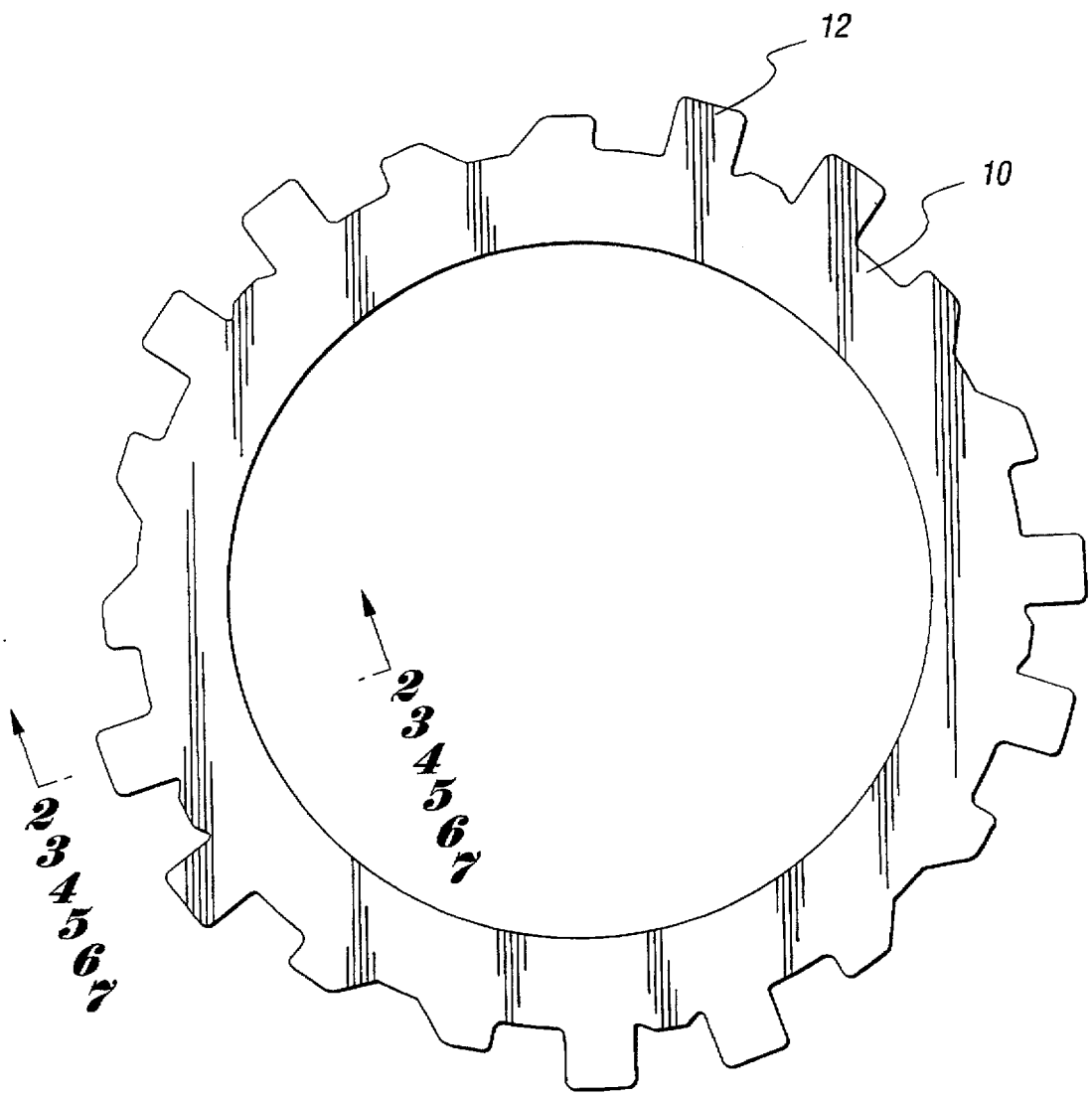
FIG. 1 is a side view of a clutch separator plate, showing a typical perimeter configuration.

FIG. 1 shows a typical perimeter configuration of a clutch separator plate 10 having external splines 12.

Figure 2:
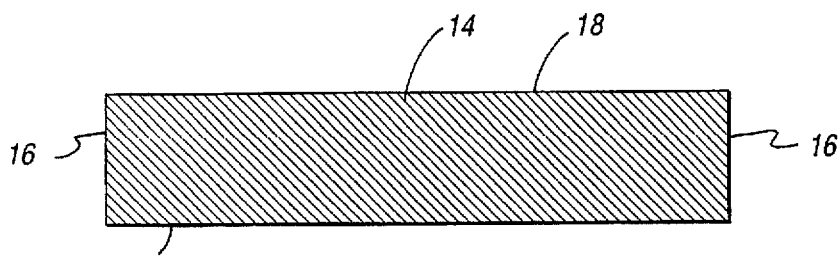
FIG. 2 is a cross-sectional view taken along line 2—2 of FIG. 1 showing a typical clutch separator plate formed by the fine blanking method of manufacture.

FIG. 2, which is a section taken along line 2—2 in FIG. 1, shows the typical geometry of a clutch separator plate 14 formed by the fine blanking method of manufacture. The resultant circumferential shear surface 16 is substantially smooth and perpendicular to the side surface 18.

Figure 3:
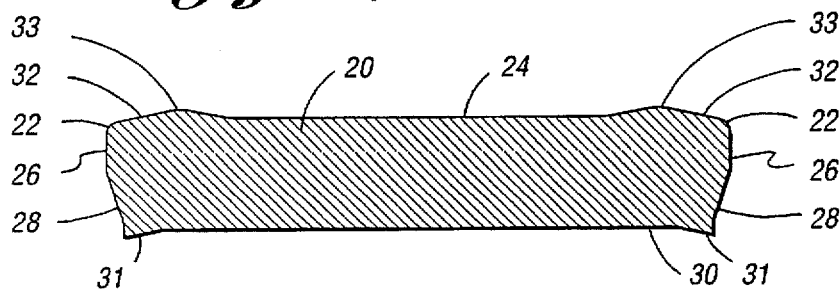
FIG. 3 is a cross-sectional view taken along line 3—3 of FIG. 1 showing a typical separator plate formed by the punch and die method of manufacture.

FIG. 3, which is a section taken along line 3—3 in FIG. 1, shows a typical clutch separator plate 20 formed by the punch and die method of manufacture. The deformations resulting from the punch and die method of manufacture have been exaggerated in this figure, and in the other figures, for illustrative purposes. As shown in FIG. 3, the exterior perimeter edge of such a separator plate 20 has a circumferential radiused portion 22 adjacent a shear side 24, a circumferential shear surface 26 adjacent the radiused portion 22, and a circumferential die break surface 28 which is adjacent a die break side 30. The circumferential shear surface 26 is substantially smooth and is substantially perpendicular to the shear side 24. As can be seen on FIG. 3, the die break surface 28 is somewhat rough and depressed relative to the shear surface 26.

As a result of the punch and die method of forming such a typical separator plate 20, a portion of the die break side 30 may also take the form of a die break protrusion 31 along the perimeter of the plate 20 where the plate 20 was pulled away from the sheet metal during manufacture. As another result of the punch and die method of manufacture, a portion of the shear side 24 may take the form of a depressed area 32 along the perimeter of the plate 20 caused by the die initially engaging the sheet metal during manufacture. This may in turn cause a slight upset protrusion 33 to be formed along the substantially circular perimeter of the depressed area 32.

Figure 4:
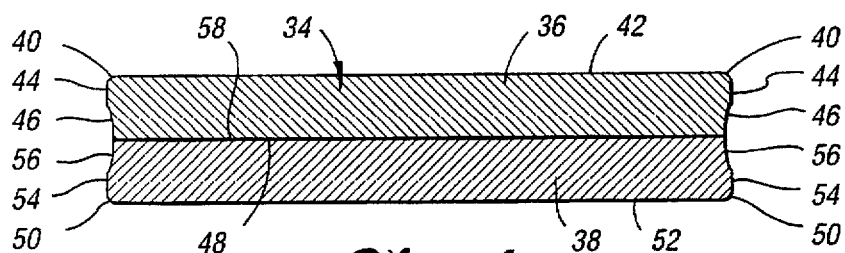
FIG. 4 is a cross-sectional view taken along line 4—4 of FIG. 1 showing one embodiment of the invention.

FIG. 4, which is a section taken along line 4—4 of FIG. 1, shows one embodiment of the invention. In this embodiment, the separator plate 34 is comprised of a first plate 36 and a second plate 38. Each of these plates, 36 and 38, is formed by the punch and die method of manufacture. As a result, the exterior perimeter edge of the first plate 36 has a first circumferential radiused portion 40 adjacent a first shear side 42, a first circumferential shear surface 44 adjacent the first radiused portion 40, and a first circumferential die break surface 46 which is adjacent a first die break side 48. Similarly, the exterior perimeter edge of the second separator plate 38 has a second circumferential radiused portion 50 adjacent a second shear side 52, a second circumferential shear surface 54 adjacent the second radiused portion 50, and a second circumferential die break surface 56 which is adjacent a second die break side 58. As shown in FIGS. 1 and 4, in the preferred orientation the separator plate 34 is formed by placing the first die break side 48 of the first plate 36 adjacent the second die break side 58 of the second plate 38 such that the external splines 12 are aligned.

During operation of the automatic transmission, lubricating/cooling fluid used within the automatic transmission may flow between the first die break side 48 and the second die break side 58, especially when the friction plates and separator plates within the clutch housing are disengaged. The fluid circulating between the first plate 36 and the second plate 38 will increase the durability of the separator plate 34 by cooling the plates and minimizing hot spotting.

Within the clutch housing, the first plate 36 and the second plate 38 will slide along the symmetrically located circumferential shear bearing surfaces 44 and 54 respectively. The sliding of the separator plate 34 will be further facilitated by the first radiused portion 40 and the second radiused portion 50 located circumferentially at the outside perimeter of the separator plate 34. Also, lubricating/cooling fluid within the transmission may collect in the pocket formed by the first die break surface 46 and the second die break surface 56. This fluid will aid in allowing the plates to slide properly within the clutch housing of the automatic transmission.

Figure 5:
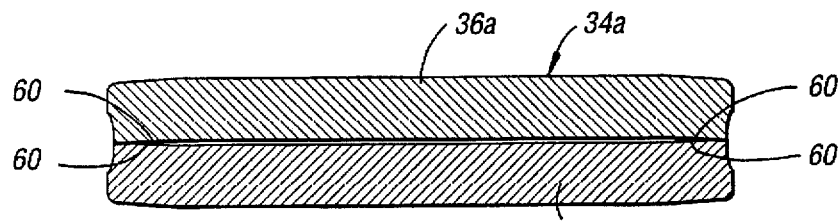
FIG. 5 is a cross-sectional view taken along line 5—5 of FIG. 1 showing a second embodiment of the invention.

FIG. 5, which is a section taken along line 5—5 of FIG. 1, shows a second embodiment of the invention which is identical to the first embodiment shown in FIG. 4 except for the presence of the die break protrusions 60 formed as a result of the punch and die manufacturing method. These die break protrusions 60 serve to keep the first plate 36a and the second plate 38a separated even during compression of the plates within the clutch housing. Thus, a thin layer of fluid within the transmission will always be present between the two plates, thereby cooling the plates and maximizing durability.

Figure 6:
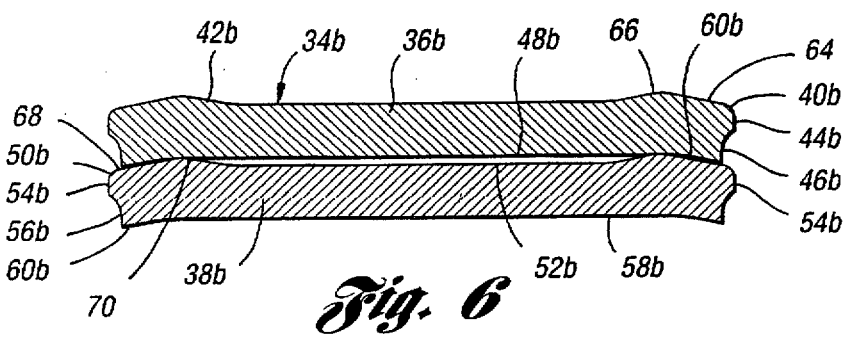
FIG. 6 is a cross-sectional view taken along line 6—6 of FIG. 1 showing a third alternative embodiment of the invention.

FIG. 6, which is a section taken along line 6—6 of FIG. 1, shows a third embodiment of the invention which is identical to the second embodiment shown in FIG. 5 except that the second plate 38b is turned around. In this embodiment, separator plate 34b is comprised of a first plate 36b and second plate 38b, both formed by the punch and die method of manufacture. As a result of the punch and die method of manufacture, the exterior perimeter edge of the first plate 36b has a first circumferential radiused portion 40b, a first depressed area 64 and a first upset protrusion 66 on the first shear side 42b. The first plate 36b also has a first circumferential shear surface 44b adjacent the first radiused portion 40b, and a first circumferential die break surface 46b and a first die break protrusion 60b on the outer perimeter of the first die break side 48b.

Similarly, the interior perimeter edge of the second separator plate 38b has a second circumferential radiused portion 50b, a second depressed area 68, and a second upset protrusion 70 on the second shear side 52b. The second separator plate 38b also has a second circumferential shear surface 54b adjacent the second radiused portion 50b, a second circumferential die break surface 56b adjacent the second die break side 58b, and a second die break protrusion 60b on the outer perimeter of the second die break side 58b.

As shown in FIG. 6, the separator plate 34b is formed by placing the first die break side 48b of the first plate 36b adjacent the second shear side 52b of the second plate 38b.

Because of the surface irregularities consisting of the first die break protrusion 60b of the first plate 36b and the second depressed area 68 and second upset protrusion 70 of the second plate 38b, the two plates 36b and 38b will be spaced slightly apart. This spacing will allow lubricating/cooling fluid to flow between and cool the plates during operation.

Within the clutch housing, sliding of the separator plate 34b will be facilitated by the existence of the two shear bearing surfaces 44b and 54b. Also, the lubricating/cooling fluid within the transmission may collect in the pocket formed by the first die break surface 46b. This fluid will aid in allowing the plates to slide properly within the clutch housing of the automatic transmission.

Figure 7:
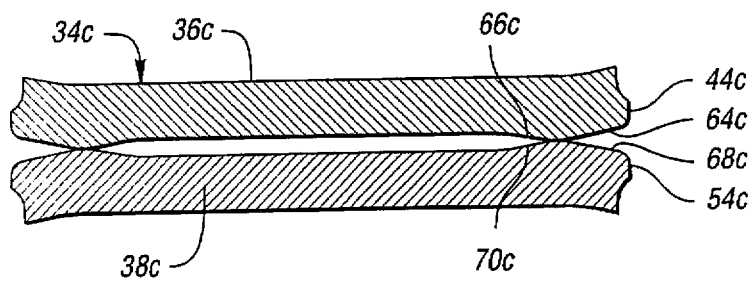
FIG. 7 is a cross-sectional view taken along line 7—7 of FIG. 1 showing a fourth alternative embodiment of the invention.

FIG. 7, which is a section taken along line 7—7 of FIG. 1, shows a fourth embodiment of the invention which is identical to the second embodiment shown in FIG. 5 except that the first plate 36c and the second plate 38c of the separator plate 34c are both turned around. As a result, the first plate 36c and the second plate 38c are spaced apart by the upset protrusions 66c and 70c which bear on each other. Similar to the previous embodiments, this spaced apart relationship will allow lubricating/cooling fluid to flow between the plates. Furthermore, and again similar to the previous embodiments, the first plate 36c and the second plate 38c will slide along the symmetrically located circumferential shear bearing surface 44c and 54c, respectively. The sliding of the separator plate 34c may be further facilitated by the small amount of lubricating/cooling fluid which may collect in the small gap formed between the depressed areas 64c and 68c of both the first plate 36c and the second plate 38c respectively.

Figure 8:
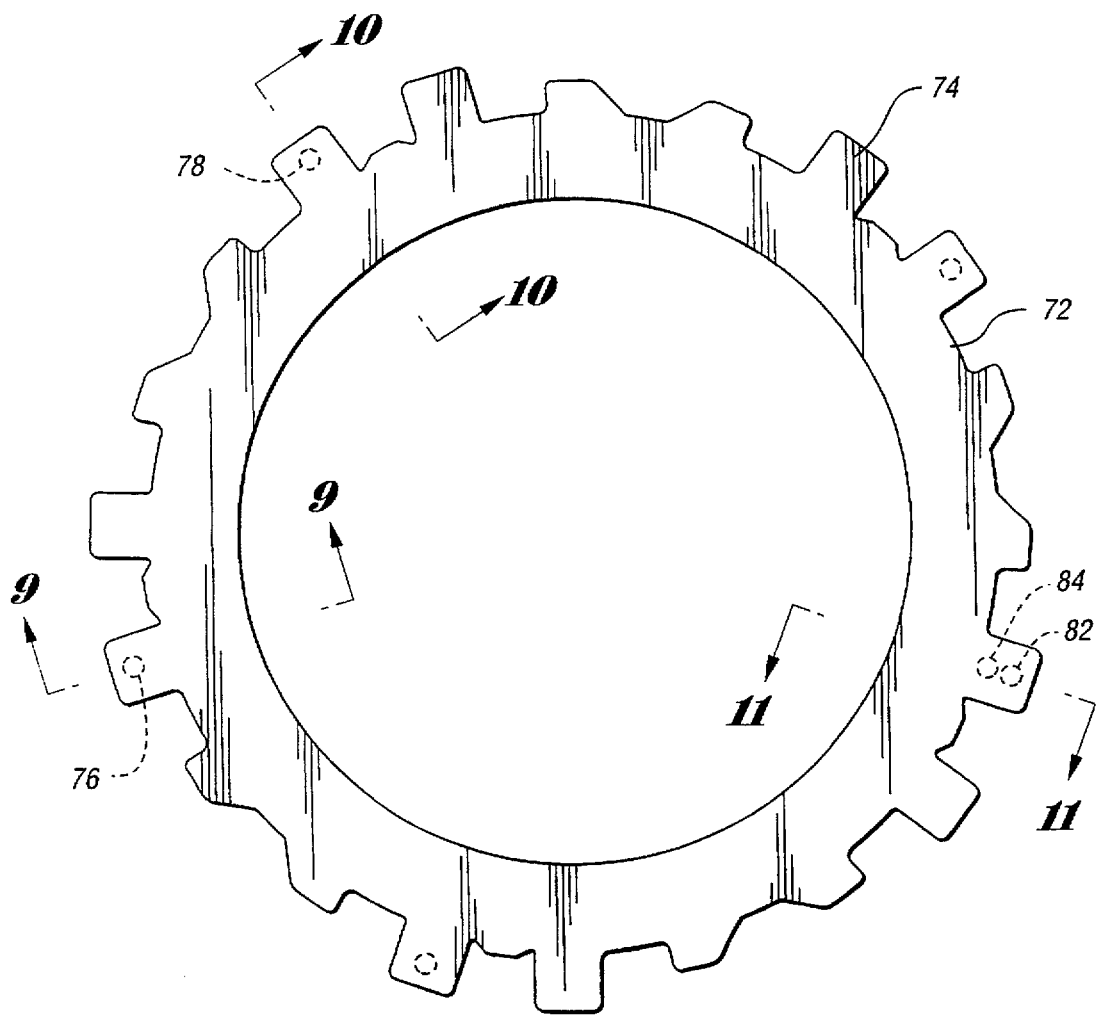
FIG. 8 is a side view of a clutch separator plate, showing an embodiment of the invention wherein protrusions are formed on the splines.

FIG. 8 shows a perimeter configuration of a clutch separator plate 72 having external splines 74 and manufactured protrusions.

Figure 9:
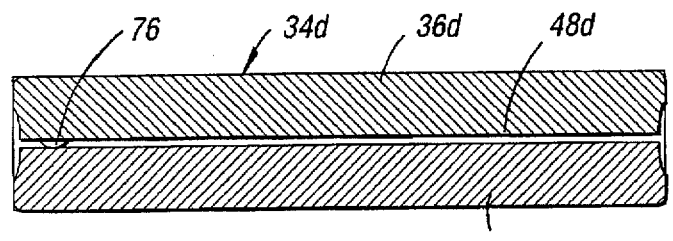
FIG. 9 is a cross-sectional view taken along line 9—9 of FIG. 8 showing a fifth embodiment of the invention.

FIG. 9, which is a section taken along line 9—9 of FIG. 8, shows a fifth embodiment of the invention. This embodiment is similar to the first embodiment illustrated in FIG. 4 with the exception that manufactured protrusions 76 are located on the first die break side 48d of the first plate 36d. These protrusions 76, which are preferably located on the external splines 74 to keep them from interfering with the normal functioning of the separator plate 34d, serve the same purpose as the die break protrusions 60 of the embodiment shown in FIG. 5. The protrusions 76 keep the two plates 36d and 38d separated, allowing fluid to flow between the plates, thereby cooling them. Such protrusions 76 may be stamped into the plate 36d or they may be formed by any other method known in the art.

Figure 10:
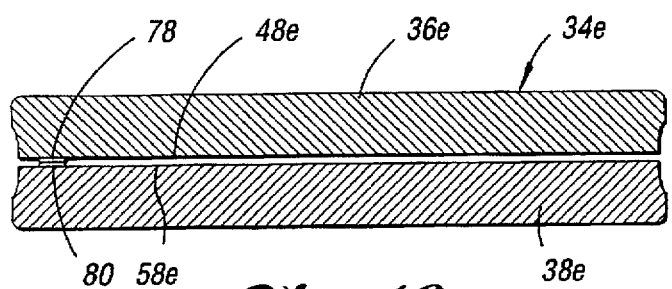
FIG. 10 is a cross-sectional view taken along line 10—10 of FIG. 8 showing a sixth embodiment of the invention.

As shown in FIG. 10, which is a section taken along line 10—10 of FIG. 8, the same cooling effect can be achieved in a sixth embodiment by locating protrusions 78 and 80 on the first die break side 48e of the first plate 36e and the second die break side 58e of the second plate 38e in such a manner as to bear upon each other when the first plate 36e and second plate 38e of the separator plate 34e are aligned properly within the clutch housing of the automatic transmission.

Figure 11:
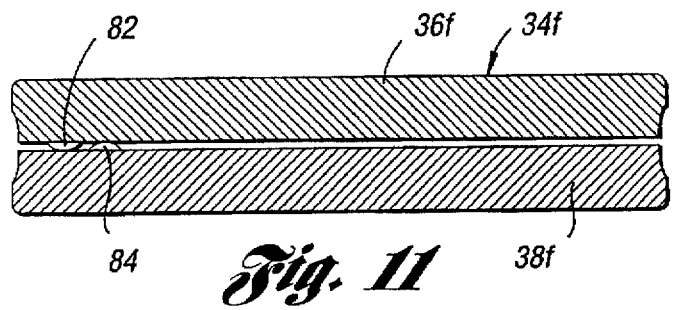
FIG. 11 is a cross-sectional view taken along line 11—11 of FIG. 8 showing a seventh embodiment of the invention.

As shown in FIG. 11, which is a section taken along line 11—11 of FIG. 8, the same effect can also be achieved in a seventh embodiment by locating similar protrusions 82 and 84 in such a manner as they will not bear upon each other, but will still serve to keep the first plate 36*f* and second plate 38*f* of the separator clutch plate 34*f* separated during operation of the automatic transmission.

Figure 12:
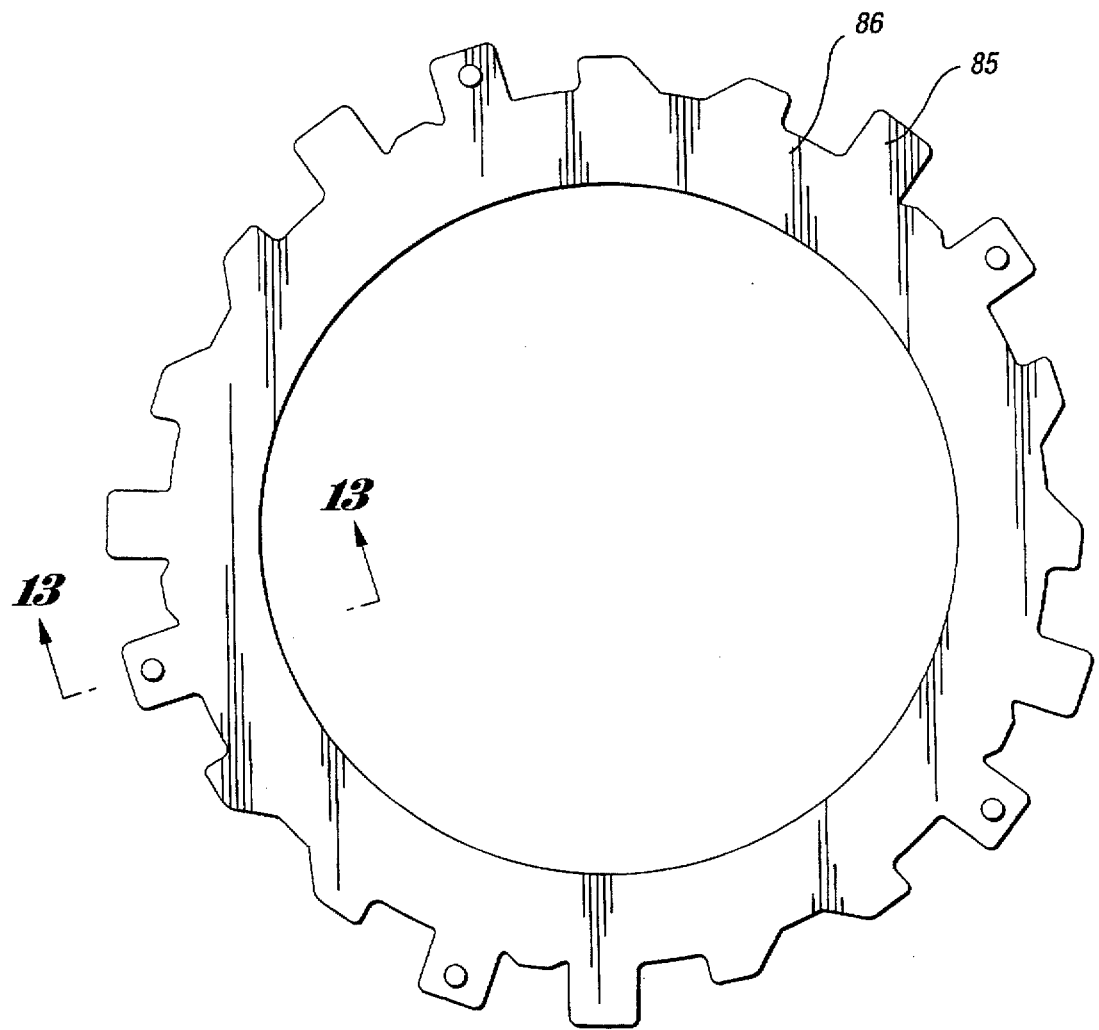
FIG. 12 is a side view of a clutch separator plate, showing an alternative embodiment wherein protrusions are formed on each side of the splines.

FIG. 12 shows a perimeter configuration of a clutch separator plate 86 having external splines 88 and manufactured protrusions.

Figure 13:
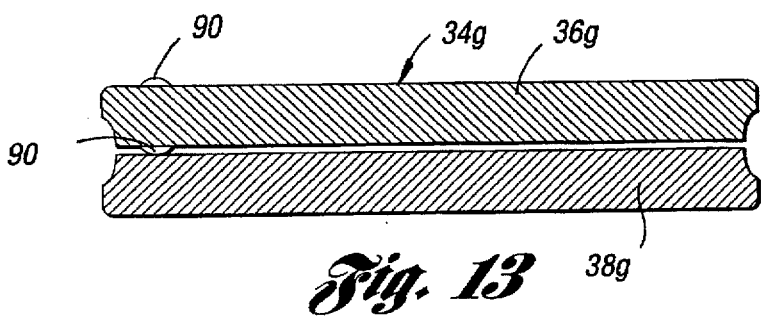
FIG. 13 is a cross-sectional view taken along line 13—13 of FIG. 12 showing an eighth alternative embodiment of the invention.

FIG. 13, which is a section taken along line 13—13 in FIG. 12, shows an eighth embodiment of the invention wherein protrusions 90 are formed on both sides of the external splines 88 of the separator clutch plate 34*g*. Similar to the fifth embodiment shown in FIG. 9, these protrusions 90 serve to keep the two plates 36*g* and 38*g* separated, allowing fluid to flow between the plates and cool them. Furthermore, because the protrusions 90 are located on both sides of the first plate 36*g*, either side of the first plate 36*g* may be placed adjacent the second plate 38*g* in order for the separator plate 34*g* to function properly.

Figure 14:
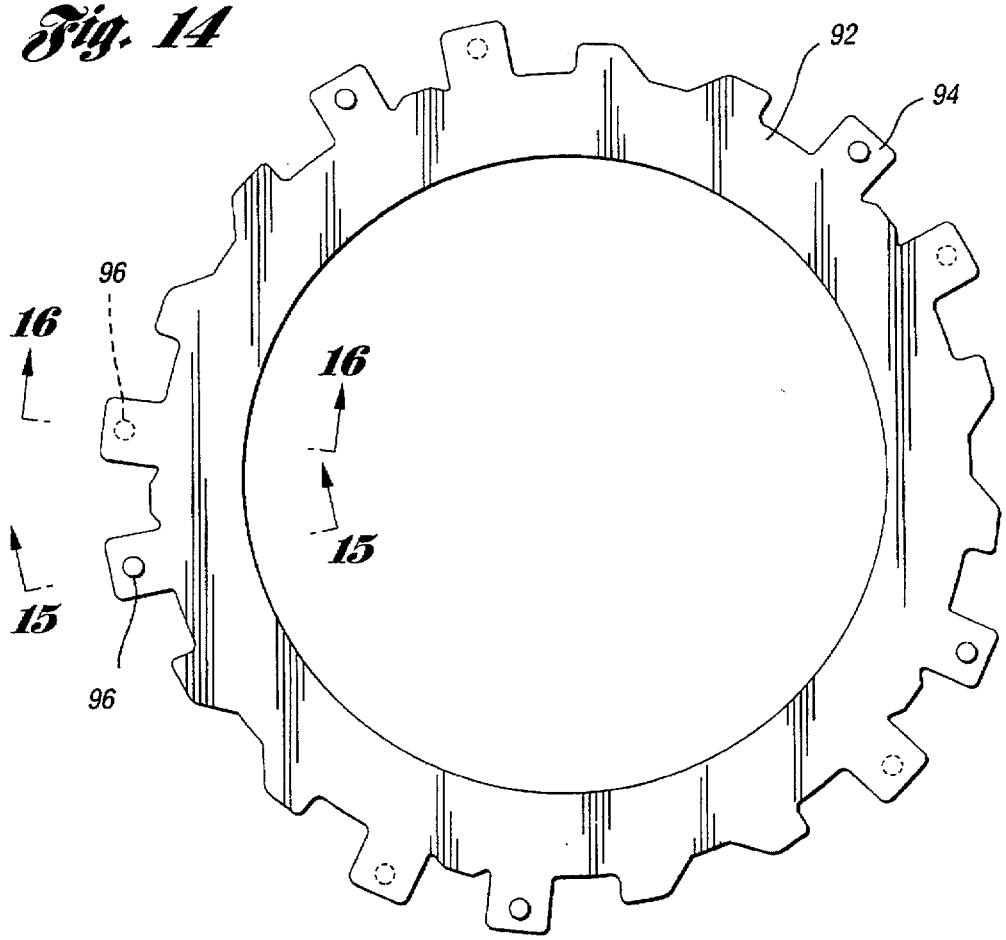
FIG. 14 is a side view of a clutch separator plate, showing an alternative embodiment wherein protrusions are formed alternately on each side of the splines.

FIG. 14 shows a perimeter configuration of a clutch separator plate 92 having external splines 94 and manufactured protrusions.

Figure 15:
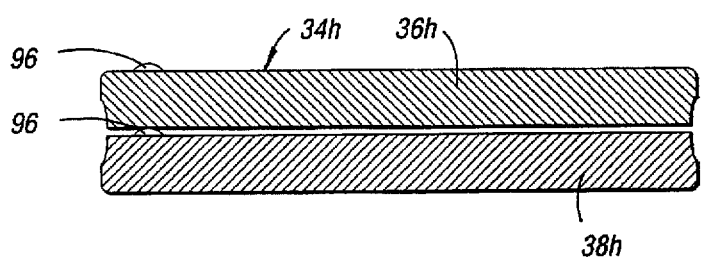
FIG. 15 is a cross-sectional view taken along line 15—15 of FIG. 14 showing a ninth alternative embodiment of the invention.

FIG. 15, which is a section taken along line 15—15 of FIG. 14, shows a ninth embodiment of the invention in which both the first plate 36*h* and second plate 38*h* of the separator plate 34*h* have protrusions 96 formed on the splines 94. These protrusions 96 are alternated on both sides of the splines 94 of both the first plate 36*h* and the second plate 38*h* such that when the splines are aligned properly, no two protrusions 96 will abut each other. This will enable all plates to be manufactured identically and for any such plate to be used as the first plate 36*h* or the second plate 38*h*.

Figure 16:
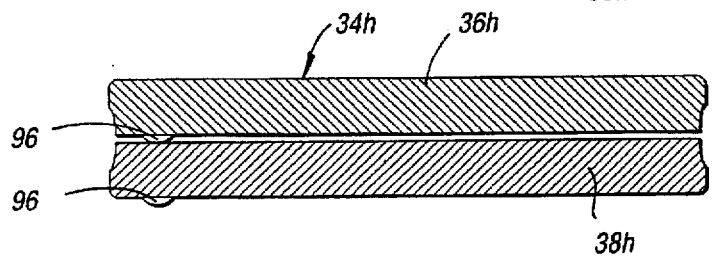
FIG. 16 is a cross-sectional view taken along line 16—16 of FIG. 14 showing the ninth alternative embodiment of the invention.

FIG. 16, which is a section taken along line 16—16 of FIG. 14, further illustrates the ninth embodiment and shows the alternation of the protrusions 96 on the splines 94.

In view of the fact that using the punch and die method to manufacture separator plates is well known in the art, no discussion of that method will be undertaken here. However, with regard to all embodiments of the present invention, it has been found that if the radiused portion and the shear surface together comprise approximately 20% of the total width of each plate the resulting separator plate will operate appropriately. Furthermore, while such plates may be manufactured from SAE 1020 steel, other grades, such as SAE 1035 and SAE 1050 steel, are also suitable.

While particular embodiments of the invention have been illustrated and described, it will be obvious to those skilled in the art that various changes and modifications may be made to the invention without departing from the invention. For instance, and without limitation, while the protrusions described to keep the plates spaced apart may comprise deformations resulting from the punch and die method of manufacture or mechanically manufactured protrusions, the invention includes any deformations, projections, or attachments which function to keep two or more plates of a clutch separator plate in a spaced apart relationship. It is intended that the appended claims cover all such modifications and equivalents as fall within the true spirit and scope of this invention.

What is claimed is:

1. A clutch plate comprising
a first plate having a first shear side, a first die break side, and a first deformation resulting from a punch and die method of manufacture, the first shear and break sides when including the first deformation being substantially flat, and at least a second plate having a second shear side, a second die break side, and a second deformation resulting from a punch and die method of manufacture, the second shear and die break sides when including the second deformation, being substantially flat, one of the first die break side and first shear side being located adjacent one of the second die break side and the second shear side such that there is a gap between the first plate and second plate when the first plate is in contact with the second plate due to at least one of the first and second deformations resulting from the punch and die method of manufacture.

2. A clutch plate as defined in claim 1 wherein the first die break side is located adjacent the second die break side.

3. The clutch plate as defined in claim 1 wherein the first plate defines a first spline.

4. The clutch plate as defined in claim 3 wherein the second plate has a second spline, and the configurations of the first and second splines are substantially identical such that the first and second splines are substantially aligned.

5. The clutch plate as defined in claim 4 wherein the first plate has a first outside perimeter and the first spline is defined by the first outside perimeter and the second plate has a second outside perimeter and the second spline is defined by the second outside perimeter.

6. The clutch plate as defined in claim 3 wherein the first plate has a first outside perimeter and the first spline is defined by the first outside perimeter.

7. The clutch plate as defined in claim 1 wherein the first plate has a circumferential first shear surface and a circumferential first die break surface between the first shear surface and the first die break side; and the second plate has a circumferential second shear surface and a circumferential second die break surface between the second shear surface and the second die break side.

8. The clutch plate as defined in claim 7 wherein the first die break side is located adjacent the second die break side.

9. The clutch plate as defined in claim 7 wherein the first die break side has a first die break protrusion and the first shear side has a first depressed area resulting from the punch and die method of manufacture, and the second die break side of the second plate has a second die break protrusion and the second shear side has a second depressed area resulting from the punch and die method of manufacture.

10. The clutch plate as defined in claim 9 wherein the first die break side is located adjacent the second die break side.

11. The clutch plate as defined in claim 7 wherein the first die break side has a first die break protrusion and the first shear side has a first depressed area and a first upset protrusion resulting from the punch and die method of manufacture, and the second die break side of the second plate has a second die break protrusion and the second shear side has a second depressed area and a second upset protrusion resulting from the punch and die method of manufacture.

12. The clutch plate as defined in claim 11 wherein the first die break side is located adjacent the second die break side.

13. The clutch plate as defined in claim 11 wherein the first plate has a circumferential first radiused surface adjacent the first shear side, and the circumferential first shear surface is adjacent the first radiused surface; and the second plate has a circumferential second radiused surface adjacent the second shear side, and the circumferential second shear surface is adjacent the second radiused surface.

14. A clutch plate as defined in claim 13 wherein the first die break side is located adjacent the second die break side.

15. The clutch plate as defined in claim 1 wherein the first and second plates are unperforated.

16. The clutch plate as defined in claim 1 wherein the first plate has a first perimeter edge and the second plate has a second perimeter edge and the first deformation is located adjacent the first perimeter edge and the second deformation is located adjacent the second perimeter edge.

17. The clutch plate as defined in claim 1 wherein the first and second deformations are circumferential.

18. A method of making a clutch plate for use in a clutch plate assembly, the method comprising:
   first manufacturing via a punch and die method a first plate having a first shear side, a first die break side, and a first deformation resulting from the punch and die method of manufacture, the first shear and break sides when including the first deformation being substantially flat,
   second manufacturing via a punch and die method a second plate having a second shear side, a second die break side, and a second deformation resulting from the punch and die method of manufacture, the second shear and break sides when including the second deformation being substantially flat, and
   placing the first plate and the second plate together such that when the first die side and first shear side is adjacent one of the second die break side and the second shear side such that there is a gap between the first plate and second plate when the first plate is in contact with the second plate due to at least one of the first and second deformations resulting from the punch and die method of manufacture.

19. The method as defined in claim 18 further including the step of orienting the first plate and the second plate to each other such that the first side break side of the first plate is adjacent the second die break side of the second plate.

20. A clutch plate comprising at least two thinner plates where at least one of the thinner plates has a shear side, a die break side, and a deformation resulting from a punch and die method of manufacture, the shear and break sides when including the first deformation being substantially flat, such that there is a gap between the at least one of the thinner plate and the other thinner plate due to the deformation when the at least one thinner plate is in contact with the other thinner plate.

21. The clutch plate as defined in claim 20 wherein the at least one thinner plate and the other thinner plate have splines.

22. The clutch plate as defined in claim 20 wherein the at least one thinner plate has a perimeter edge and the deformation is located adjacent the perimeter edge.

23. The clutch plate as defined in claim 22 wherein the deformation is circumferential.

24. A clutch plate comprising
   a first plate having a first shear side, a first die break side, a first perimeter edge, and a first deformation resulting from the punch and die method of manufacture when used to form the first perimeter edge, and
   at least a second plate, one of the first die break side and first shear side of the first plate being located adjacent the second plate such that there is a gap between the first plate and second plate when the first plate is in contact with the second plate due to the first deformation.

25. The clutch plate as defined in claim 24 wherein the first plate has first splines and the second plate has second splines.

26. The clutch plate as defined in claim 24 wherein the first deformation is circumferential.

27. The clutch plate as defined in claim 24 wherein the second plate has a second shear side, a second die break side, a second perimeter edge, and a second deformation resulting from the punch and die method of manufacture when used to form the second perimeter edge, one of the first die break side and first shear side being located adjacent one of the second die break side and the second shear side such that there is a gap between the first plate and second plate when the first plate is in contact with the second plate due to at least one of the first and second deformations.

28. The clutch plate as defined in claim 27 wherein the first plate has first splines and the second plate has second splines.

29. The clutch plate as defined in claim 27 wherein the first and second deformations are circumferential.

* * * * *